No. 884,684.　　　　　　　　　　　　　　PATENTED APR. 14, 1908.
E. D. ROCKWELL.
TROLLEY HARP AND WHEEL.
APPLICATION FILED JUNE 1, 1906.

WITNESSES:
John W. Bryce

INVENTOR.
Edward D. Rockwell,
BY
his ATTORNEY.

UNITED STATES PATENT OFFICE.

EDWARD D. ROCKWELL, OF BRISTOL, CONNECTICUT, ASSIGNOR, BY MESNE ASSIGNMENTS, TO THE NEW DEPARTURE MANUFACTURING COMPANY, OF BRISTOL, CONNECTICUT, A CORPORATION OF CONNECTICUT.

TROLLEY HARP AND WHEEL.

No. 884,684.

Specification of Letters Patent.

Patented April 14, 1908.

Application filed June 1, 1906. Serial No. 319,686.

*To all whom it may concern:*

Be it known that I, EDWARD D. ROCKWELL, a citizen of the United States, residing at Bristol, in the county of Hartford and State of Connecticut, have invented a new and useful Improvement in Trolley Harps and Wheels; and I do hereby declare the following, when taken in connection with the accompanying drawings, and the letters of reference marked thereon, to be a full, clear, and exact description of the same, and which said drawings constitute part of this specification, and represent, in—

Figure 1:
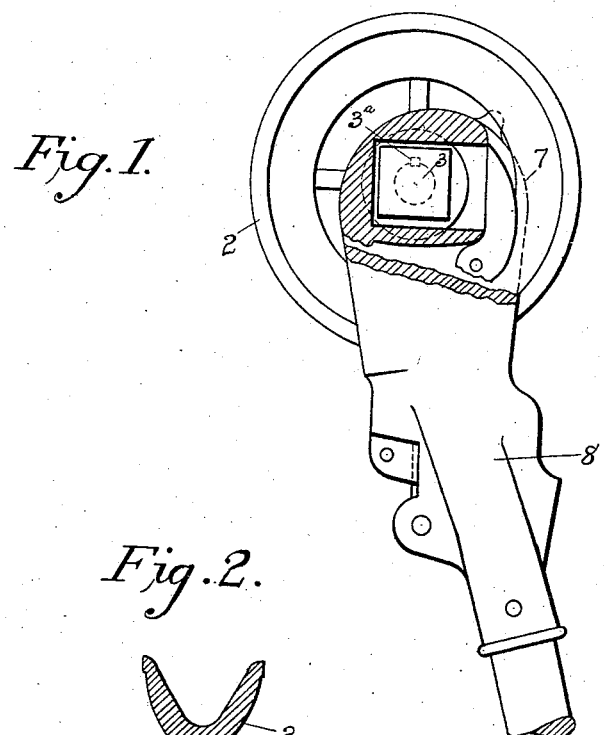
Figure 2:
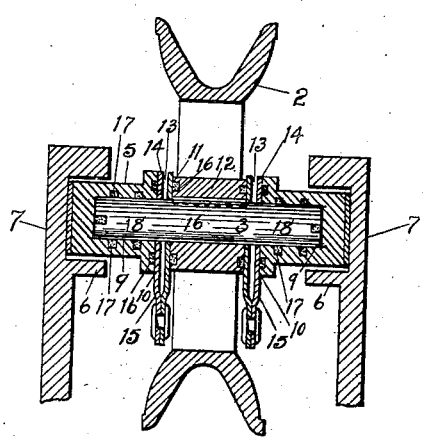
Figure 3:
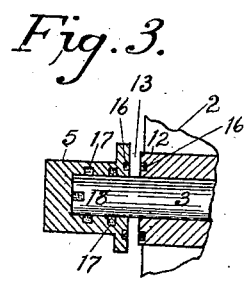

Figure 1 a broken view in side elevation of a trolley harp and wheel constructed in accordance with my invention. Fig. 2 an enlarged broken sectional view of the wheel and harp showing the particular mode of mounting the wheel therein. Fig. 3 a detail view showing the safety space provided for between the sides of the wheel and the inner ends of the bearing blocks by the engagement of the blocks with the ends of the journal.

This invention relates to the general class of trolleys and particularly to a current collector and harp through which the current of electricity is conveyed from the conductor to the motor.

One of the objects of the invention is to provide means whereby the excessive friction due to the sides of the collector (in most cases a trolley wheel) grinding against the sides of the harp or contact springs so as to cause excessive friction with the attendant evils thereof will be avoided.

Another object of the invention is to provide means whereby the contact spring or springs used to conduct the electricity from the collector to the harp will not become wholly compressed, but whereby said spring or springs will relatively, lightly bear against the side or sides of the collector and, on account of the relatively small amount of friction, the life of said spring or springs will be lengthened.

In disclosing my invention, I have illustrated the collector as a trolley wheel 2 fixed on a rotating axle or journal 3, the projecting ends of which are supported in bearings 5 whose exteriors are of polygonal form, preferably rectangular, and carried in guide-ways 6 corresponding to each other and illustrated as grooves in the inner face of the outer ends of the parallel arms 7 of the trolley harp 8. These guide-ways 6 permit of a limited sliding movement of each of the bearings 5 and thus permit of a sidewise movement of the journal 3 of the collector 2. The projecting ends of the fixed journal 3 are of such length with respect to the recesses 9 in the journal bearings 5 that the ends of the journal will at all times engage or abut against the bottoms of the journal holes or recesses 9. Therefore, it is of no consequence in what position the trolley wheel or collector is, there will always be a space between each end of the hub and the adjacent face of the bearing for the journal 3. In view of the fact that the journal 3 would be insufficient to transmit the highest voltage from the collector or wheel to the harp I deem it advisable, under certain conditions, to interpose between the respective ends of the hub and the adjacent bearings conductors, illustrated as springs, in the present instance, comprising flat blades or disks 14 having arms or projections 15 which are riveted together as shown in Fig. 2, so that the coöperating blades or disks have a natural tendency to spring apart and thus maintain a perfect contact between the wheel and its bearings. It will be impossible to grind out these contacts as quickly as would occur if the structure did not provide means for permanently establishing a space between the side of the collector or trolley wheel and its bearing.

It may not be necessary, under certain conditions, to employ the contact elements which are interposed between the trolley wheel and the bearings 5, for example, where a relatively light current is required, these contacts may be omitted, but in most instances, I prefer to employ them. The inner faces of the journal bearings may be provided with lubricating channels 16 for the reception of a suitable lubricant, and the journal holes 10 may be formed with channels 17 for the reception of a lubricant. The ends of the journal may be provided with lubricant receiving recesses 18 and, indeed, any part rotating within a part may be conveniently lubricated by providing grooves or channels in which any lubricant may be placed. It will be observed that the wheel 2 is fast on the axle or journal 3 and is held against rotative movement with respect to the journal 3 by means of a key 3ª. By reference to the drawings, it will be observed that while the journal is permitted to have lateral movement, longitudinal movement is prevented because the ends of the journal abut against the ends of the recesses 9.

I claim:

1. The combination with a trolley harp having guides therein, of journal blocks slidable in said guides and provided with holes or recesses, a collector wheel having a fixed journal whose ends project beyond the hub of said wheel and whose ends engage the holes or recesses in the said blocks, the length of said journal being the same as the distance between the outer ends of said recesses whereby said journal is prevented from having longitudinal movement in said recesses, so that permanent spaces are provided between the hub and the ends of the bearing blocks, and contacts interposed between the ends of the hub and the ends of the bearing blocks.

2. The combination with a trolley harp having guides therein, of journal blocks slidable in said guides and provided with holes or recesses, a collector wheel having a fixed journal whose ends project beyond the hub of said wheel and whose ends engage the holes or recesses in the said blocks, the length of said journal being the same as the distance between the outer ends of said recesses whereby said journal is prevented from having longitudinal movement in said recesses, so that permanent spaces are provided between the hub and the ends of the bearing blocks, and spring contacts interposed between the ends of the hub and the ends of the bearing blocks.

3. The combination with a trolley harp having guides therein, of journal blocks slidable in said guides and provided with holes or recesses, a collector wheel having a fixed journal whose ends project beyond the hub of said wheel and whose ends engage the holes or recesses in the said blocks, the length of said journal being the same as the distance between the outer ends of said recesses whereby said journal is prevented from having longitudinal movement in said recesses, so that permanent spaces are provided between the hub and the ends of the bearing blocks, and spring contacts interposed between the ends of the hub and the ends of the bearing blocks, said spring contacts comprising flat members secured together.

In testimony whereof, I have signed this specification in the presence of two subscribing witnesses.

EDWARD D. ROCKWELL.

Witnesses:
 EDSON M. PECK,
 MONICA S. BROCK.